United States Patent [19]
Ando

[11] Patent Number: 5,918,065
[45] Date of Patent: *Jun. 29, 1999

[54] MICROPROCESSOR WITH REDUCED AREA COUPLING A REGISTER FILE WITH A PLURALITY OF FUNCTIONAL UNITS

[75] Inventor: Hideki Ando, Hyogo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/881,132

[22] Filed: Jun. 24, 1997

Related U.S. Application Data

[63] Continuation of application No. 08/430,666, Apr. 28, 1995, abandoned.

[30] Foreign Application Priority Data

May 20, 1994 [JP] Japan .............................. 6-106534 (P)

[51] Int. Cl.[6] .................................................. G06F 13/00
[52] U.S. Cl. ............... 395/800.42; 395/391; 395/800.32; 364/491; 364/489
[58] Field of Search .......................... 395/800.11, 800.16, 395/800.32, 800.42, 800.23, 800.24, 391, 566; 364/489, 491; 711/109

[56] References Cited

U.S. PATENT DOCUMENTS

| | | | |
|---|---|---|---|
| 4,670,846 | 6/1987 | Laws | 364/490 |
| 4,951,221 | 8/1990 | Corbett et al. | 364/489 |
| 5,010,511 | 4/1991 | Hartley et al. | 364/786 |
| 5,379,257 | 1/1995 | Matsumura et al. | 365/189.01 |
| 5,493,506 | 2/1996 | Sakashita et al. | 364/489 |
| 5,530,661 | 6/1996 | Garbe et al. | 364/728.01 |

FOREIGN PATENT DOCUMENTS 64-42148  2/1989  Japan .

OTHER PUBLICATIONS

"A 1,000MIPS BiCMOS Microprocessor with Superscalar Architecture", ISSCC Digest of Technical Papers, pp. 114–115, 260, Feb. 1992.

*Primary Examiner*—Larry D. Donaghue
*Attorney, Agent, or Firm*—McDermott, Will & Emery

[57] ABSTRACT

The parallel processing microprocessor includes a register file for storing a plurality of data and a plurality of groups of bit sliced circuits provided corresponding to a plurality of data. Each group of bit sliced circuits consists of a plurality of bit sliced circuits. The plurality of bit sliced circuits are arranged collectively. The plurality of bit sliced circuits are arranged corresponding to a plurality of instructions and processing in parallel a corresponding one of the plurality of data in response to the plurality of instructions.

18 Claims, 11 Drawing Sheets

MICROPROCESSOR WITH REDUCED AREA COUPLING A REGISTER FILE WITH A PLURALITY OF FUNCTIONAL UNITS

This application is a continuation of application Ser. No. 08/430,666 filed Apr. 28, 1995 now abandoned.

BACKGROUND OF THE INVENTION

1. Field of the Invention

The present invention relates to parallel processing microprocessors, and more particularly, to a layout of a parallel processing microprocessor for carrying out in parallel a plurality of processes in response to a plurality of corresponding instructions.

2. Description of the Background Art

FIG. 9 shows a layout of an example of a conventional microprocessor. Referring to FIG. 9, the microprocessor includes one functional unit 1 for processing data of 32 bits and a 32-bit register file 5. Register file 5 can store data of 32 bits. Functional unit 1 processes the 32-bit data stored in register file 5 and writes back resultant data of 32 bits to register file 5.

Functional unit 1 is formed of 32 processing circuits 100–131. Register file 5 is formed of 32 storage elements 500–531. Each storage element can store data of 1 bit. Each processing circuit processes 1-bit data stored in the corresponding storage element and writes back the 1-bit resultant data to the corresponding storage element. For example, a 0th bit portion 100 of functional unit 1 processes 1-bit data stored in a 0th bit portion 500 of register file 5 and writes back the 1-bit resultant data to 0th bit portion 500 of register file 5. A first bit portion 101 of functional unit 1 processes 1-bit data stored in a first bit portion 501 of register file 5 and writes back the 1-bit resultant data to first bit portion 501 of register file 5. Second bit portions 102, 502 through 31st bit portions 131, 531 perform similar operations as bit portions 100, 500 and 101, 501.

Functional unit 1 is pipelined, and thus, before completing the process of one instruction, it can start processing the next instruction. In functional unit 1, each bit portion is divided into three pipeline stages 10, 20 and 30.

For example, second bit portion 102 consists of an execution stage 10, a memory stage 20 and a writeback stage 30. Execution stage 10 includes a register 11 which can store 1-bit data provided from second bit portion 502 of register file 5 through a tristate buffer 41, a register 12 which can store 1-bit data provided from second bit portion 502 of register file 5 through a tristate buffer 42, and a logic circuit 13 formed by an ALU (Arithmetic and Logic Unit) for performing a logic operation of the data stored in registers 11 and 12. Memory stage 20 includes a register 21 which can store resultant data provided from logic circuit 13 in execution stage 10, and a logic circuit 22 for performing a logic operation of the data stored in register 21. Writeback stage 30 includes a register 31 which can store resultant data provided from logic circuit 22 in memory stage 20. Although only the pipeline stages of second bit portion 102 are shown in FIG. 9, other bit portions are pipelined similarly to second bit portion 102.

FIG. 10 is a timing chart showing pipeline operations of the microprocessor shown in FIG. 9. In this microprocessor, one instruction is sequentially processed in five pipeline stages.

Referring to FIGS. 9 and 10, in a first instruction fetch stage IF, one instruction is fetched from a memory (not shown) to an instruction decoder (not shown). In a second instruction decode stage ID, the fetched instruction is decoded by the instruction decoder, and in response to the decoded instruction, data is read out from register file 5 through tristate buffers 41 and 42 to registers 11 and 12. In a third execution stage EXC(10), logic circuit 13 executes the instruction and performs a logic operation of the data stored in registers 11 and 12. The resultant data of the logic operation is stored in register 21. In a fourth memory stage MEM(20), logic circuit 22 performs a logic operation of the data stored in register 21. For some instructions, data is read out from a memory. The resultant data of logic circuit 22 is stored in register 31. In a fifth writeback stage WB(30), data stored in register 31 is written back to register file 5 through a result bus 45.

Referring to FIG. 10, an instruction i1, for example, is fetched in the nth cycle. Subsequently, in the (n+1) cycle, the fetched instruction i1 is decoded, and at the same time, the next instruction i2 is fetched. Thereafter, in the (n+2) cycle, instruction i1 is executed and instruction i2 is decoded simultaneously. Also at the same time, the next instruction i3 is fetched. In the (n+3) cycle, responsive to instruction i1, the corresponding data is read out from a memory. At the same time, instruction i2 is executed and instruction i3 is decoded. Simultaneously, the next instruction i4 is fetched.

In the (n+4) cycle, the resultant data of instruction i1 is written back to register file 5. Simultaneously with this writeback operation, in response to instruction i2, the corresponding data is read out from a memory, instruction i3 is executed, and instruction i4 is decoded. In the (n+5) cycle, the resultant data of instruction i2 is written back to register file 5. At the same time, responsive to instruction i3, the corresponding data is read out from a memory and instruction i4 is executed. In the (n+6) cycle, the resultant data of instruction i3 is written back to register file 5, and simultaneously, the corresponding data is read out from the memory in response to instruction i4. In the (n+7) cycle, the resultant data of instruction i4 is written back to register file 5.

Here, in writeback stage WB, the resultant data is written back to register file 5 in a first half of one cycle. In instruction decode stage ID, data is read out from register file 5 in the second half of one cycle. For example, the resultant data obtained by executing instruction i1 is written back to register file 5 in the first half of the (n+4) cycle. When instruction i4 is to use this resultant data, the resultant data is read out in the second half of the (n+4) cycle from register file 5 in accordance with instruction i4. In this example, instruction i4 is executed in the (n+5) cycle without a temporary halt.

However, when instruction i2 is to use the executed result of instruction i1, the resultant data of instruction i1 has not been written into register file 5 in the (n+2) cycle in which instruction i2 reads out data from the register file. Therefore, if data is read out from register file 5 at this point, the read-out data is the one obtained before the resultant data is written. As a result, proper operation is not carried out.

Similarly, when instruction i3 is to use the executed result of instruction i1, the resultant data of instruction i1 has not been written into register file 5 in the (n+3) cycle in which instruction i3 reads out data from register file 5. As a result, if data is read out from register file 5, it is the data obtained before the resultant data has been written, and proper operation is not carried out.

Therefore, execution of instructions i2 and i3 must be halted until the executed result of instruction i1 is written into register file 5 in order to perform proper processings, leading to a decline in processing speed of instructions. In this case, the processing of instruction i2 must be halted for two cycles, and that of instruction i3 must be halted for one cycle.

In order to prevent such a decline in processing speed, a bypass circuit is provided for extracting an executed result of an instruction during its passage along the pipeline in the pipelined microprocessor in FIG. 9. The bypass circuit is formed by tristate buffers 14, 15, 23 and 24 and supply buses 43 and 44. Supply bus 43 provides a first source operand to execution stage 10. Supply bus 44 provides a second source operand to execution stage 10.

Now, operation of the bypass circuit will be described. In a general operation in which instruction i4 uses the executed result of instruction i1, what is necessary is to simply read the data already written in register file 5. Thus, tristate buffer 41 is rendered conductive and tristate buffers 14 and 23 are rendered non-conductive. As a result, data in register file 5 is read out through tristate buffer 41 to supply bus 43 and stored in register 11 of execution stage 10.

When instruction i2 is to use the executed result of instruction i1, data which is already in the execution stage may be used. Therefore, tristate buffer 14 is rendered conductive and tristate buffers 41 and 23 are rendered non-conductive. As a result, the resultant data of logic circuit 13 is read out through tristate buffer 14 to supply bus 43 and stored in register 11 of execution stage 10. The bypass circuit can thus transfer the result executed in execution stage 10 of instruction i1 to execution stage 10 of instruction i2.

When instruction i3 is to use the executed result of instruction i1, the data which is already in memory stage 20 may be used. Therefore, tristate buffer 23 is rendered conductive and tristate buffers 41 and 14 are rendered non-conductive. Consequently, the resultant data of logic circuit 22 is read out through tristate buffer 23 to supply bus 43 and stored in register 11 of execution stage 10. The bypass circuit can thus transfer data in memory stage 20 of instruction i1 to execution stage 10 of instruction i3.

Supply bus 44 transfers data extracted from execution stage 10 through tristate buffer 15 to register 12 in execution stage 10, just as supply bus 43. Supply bus 44 also transfers data extracted from memory stage 20 through tristate buffer 24 to execution stage 10.

The above description relates to a microprocessor including one functional unit 1. Now, a microprocessor including a plurality of functional units will be described in detail.

One example of a microprocessor including a plurality of functional units is a VLIW (Very Long Instruction Word) machine which is a kind of super scalar processors. A microprocessor including a plurality of functional units can process a plurality of instructions at the same time. FIGS. 11 and 12 show possible layouts of interconnections coupling one register file with a plurality of functional units in such a microprocessor including a plurality of functional units. The layouts of FIGS. 11 and 12 are shown only to clarify the objects of the present invention, and they are not the admitted prior art.

FIG. 11 shows a possible layout of interconnections coupling one register file with a plurality of unpipelined functional units.

Referring to FIG. 11, the microprocessor includes one register file 5 and four functional units 1–4. Each functional unit consists of 32 processing circuits. Functional unit 1 consists of 0th–31st bit portions 100–131. Functional unit 2 consists of 0th–31st bit portions 200–231. Functional unit 3 consists of 0th–31st bit portions 300–331. Function unit 4 consists of 0th–31st bit portions 400–431.

In order to process the corresponding 1-bit data in register file 5, each bit portion is coupled to the bit portion of register file 5 in which the data is stored. 0th bit portion 500 of register file 5 is connected to 0th bit portions 100, 200, 300 and 400 of the four functional units 1–4 through supply buses 43 and 44. First bit portion 501 of register file 5 is connected to first bit portions 101, 201, 301 and 401 of the four functional units 1–4 through supply buses 43 and 44. The 31st bit portion 531 of register file 5 is connected to 31st bit portions 131, 231, 331, and 431 of the four functional units 1–4 through supply buses 43 and 44. The second through 30th bit portions (not shown) of register file 5 are connected in a similar manner. Only the 2-bit supply buses 43 and 44 are shown in FIG. 11, and the bus corresponding to result bus 45 in FIG. 10 is not shown here. As apparent from FIG. 11, such an interconnecting method would require an enormous number of interconnections and a complicated interconnection layout.

FIG. 12 shows a possible layout of interconnections for connecting one register file with a plurality of functional units in a pipelined microprocessor.

Referring to FIG. 12, the microprocessor includes one register file 5; four functional units 1–4; and bypass circuits 50a, b–53a, b; 54–57; 58a, b–61a, b; 62–65; and 66a, b–81a, b for connecting register file 5 with functional units 1–4 and functional units 1–4 with one another.

The 0th bit portion 500 of register file 5 and 0th bit portions 100–400 of functional units 1–4 are connected through supply buses 50a, b–53a, b. Functional units 1–4 are connected with one another through extraction buses 58a, b–61a, b, transfer buses 54–57, and supply buses 50b–53b.

For example, when data is to be transferred from register file 5 to functional units 1–4, tristate buffers 62–65 are rendered conductive. As a result, data in 0th bit portion 500 of register file 5 is transferred to 0th bit portion 100 of functional unit 1 through supply bus 50a, tristate buffer 62, and supply bus 50b. Data in 0th bit portion 500 is transferred to 0th bit portion 200 of functional unit 2 through supply bus 51a, tristate buffer 63, and supply bus 51b. Data is transferred to functional units 3 and 4 in a similar manner.

As another example, if data is to be transferred from the execution stage of functional unit 1 to functional unit 2, only tristate buffer 67a is rendered conductive, whereby data in the execution stage of 0th bit portion 100 is transferred to 0th bit portion 200 of functional unit 2 through extraction bus 58a, tristate buffer 67a, transfer bus 55 and supply bus 51b.

If data is to be transferred from the execution stage of 0th bit portion 200 in functional unit 2 to 0th bit portion 100 of functional unit 1, only tristate buffer 70a is rendered conductive, and data is transferred from the execution stage of 0th bit portion 200 in functional unit 2 to 0th bit portion 100 of functional unit 1 through extraction bus 59a, tristate buffer 70a, transfer bus 54 and supply bus 50b.

When data is to be transferred from the memory stage in 0th bit portion 100 of functional unit 1 to 0th bit portion 300 of functional unit 3, only tristate buffer 68b is rendered conductive, and data is transferred from the memory stage in 0th bit portion 100 of functional unit 1 to 0th bit portion 300 of functional unit 3 through extraction bus 58b, tristate buffer 68b, transfer bus 56 and supply bus 52b.

When data is to be transferred from the execution stage in 0th bit portion 100 of functional unit 1 to 0th bit portion 100 itself, only tristate buffer 66a is rendered conductive, and data is transferred from execution stage in 0th bit portion 100 through extraction bus 58a, tristate buffer 66a, transfer bus 54 and supply bus 50b to 0th bit portion 100.

Interconnections for transferring data from first bit portion 501 of register file 5 to first bit portions 101, 201, 301 and 401 of functional units 1–4 are not shown in FIG. 12. Interconnections for transferring data among first bit portions 101, 201, 301 and 401 of functional units 1–4 are not shown. Also, interconnections for transferring data from other bit portions of register file 5 to other bit portions of functional units 1–4, and interconnections for transferring data among other bit portions of functional units 1–4 are not shown. Only interconnections for supplying a first source operand to each bit portion are shown, and interconnections for supplying a second source operand are not shown. Although widths of bit portions 100–131, 200–231, 300–331 and 400–431 are shown to be partially unequal, all widths are equal.

Here, a silicon area S required for a bypass circuit can be expressed by the following equation (1)

$$S = \text{(number of functional units} \times \text{number of source operands} \times \text{number of bits)} \times \text{occupied area per interconnection} \quad (1)$$

The value obtained by dividing silicon area S by an occupied area per interconnection is defined hereinafter as "interconnection cost". Since this microprocessor has four functional units with two source operands and 32 bits, interconnection cost thereof will be 256.

Meanwhile, in a microprocessor including one functional unit, supply buses 43 and 44 are required for coupling register file 5 and functional unit 1. However, these supply buses 43 and 44 can be formed on other circuits if multi-layered interconnection technology for LSIs is used, because widths thereof are sufficiently smaller than that of one bit portion, so that interconnection cost will be zero.

SUMMARY OF THE INVENTION

One object of the present invention is to reduce a layout area of a microprocessor including a plurality of functional units.

Another object of the present invention is to reduce an area required for interconnections coupling a register file with the plurality of functional units.

A further object of the present invention is to reduce interconnection cost of the interconnections.

Yet another object of the present invention is to reduce a layout area of a pipelined microprocessor including a plurality of functional units.

In accordance with the present invention, a microprocessor for carrying out in parallel a plurality of processes in accordance with a plurality of corresponding instructions includes a register file and a plurality of groups of bit sliced circuits. The register file stores a plurality of data. The plurality of groups of bit sliced circuits are provided corresponding to the plurality of data. Each group of bit sliced circuits are formed by a plurality of bit sliced circuits. The plurality of bit sliced circuits are provided corresponding to the plurality of instructions and processing in parallel corresponding one of the plurality of data corresponding to the plurality of instructions.

Therefore, in this microprocessor, the plurality of bit sliced circuits for processing in parallel one of the plurality of data stored in the register file in response to the plurality of instructions are arranged adjacent to one another, thereby simplifying interconnections for transferring one of the plurality of data stored in the register file to the plurality of corresponding bit sliced circuits. As a result, an area occupied by interconnections is reduced, leading to a reduction in layout area. Since interconnections are shortened, delay time of a signal can also be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Now, embodiments of the present invention will be described in detail with reference to the drawings. In the figures, the same characters indicate the same or corresponding elements.

Embodiment 1

Figure 1:
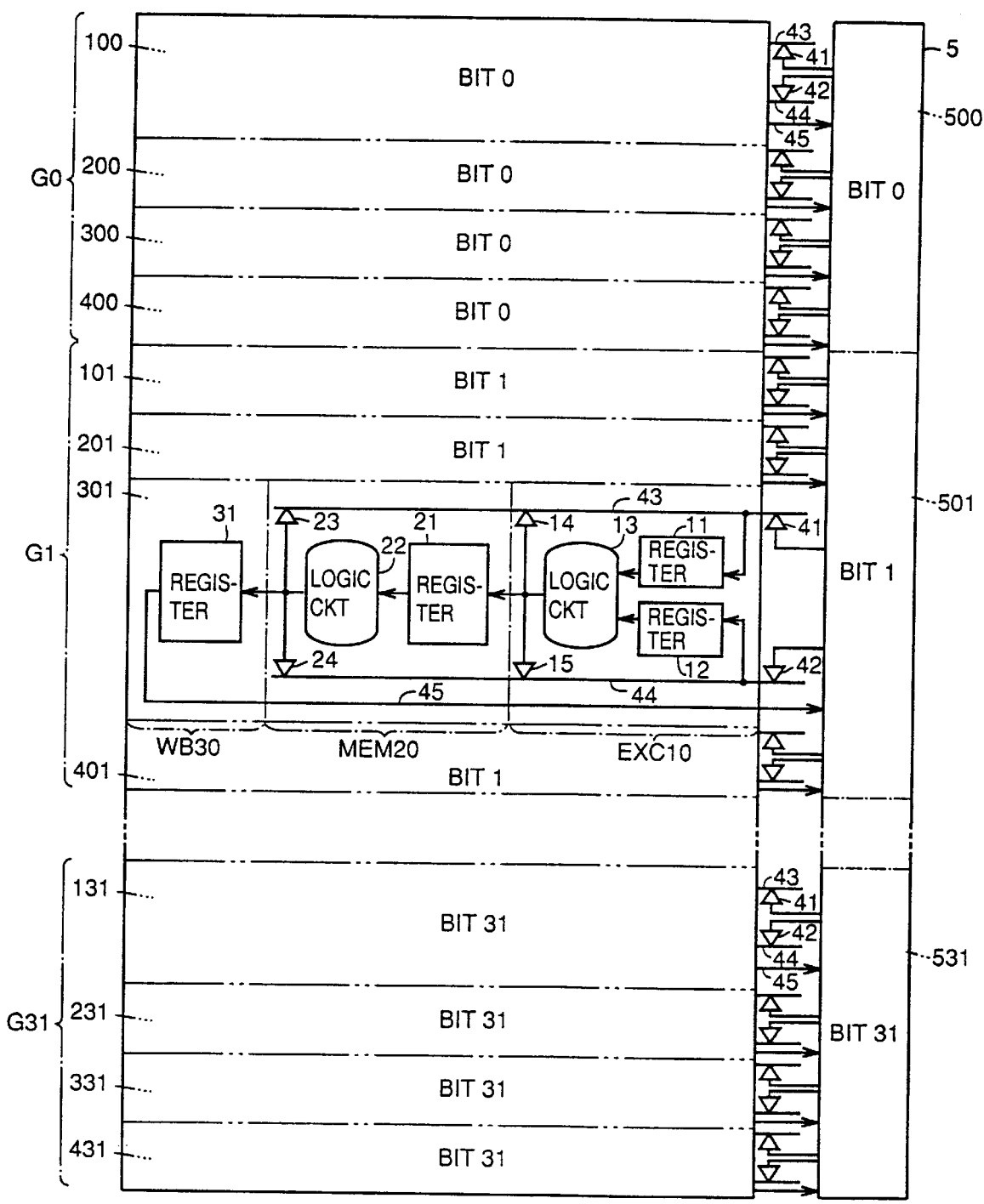
FIGS. 1, 2 and 3 show layouts of parallel processing microprocessors in accordance with first through third embodiments of the present invention.

FIG. 1 shows a layout of a microprocessor in accordance with a first embodiment of the present invention. Referring to FIG. 1, this microprocessor includes a register file 5 for storing data of 32 bits and 32 processing circuit groups G0–G31. Register file 5 consists of 32 storage elements 500–531. For example, a 0th bit (MSB) of the 32-bit data is stored in a 0th bit portion 500. A first bit of the 32-bit data is stored in a first bit portion 501. A 31st bit (LSB) of the 32-bit data is stored in a 31st bit portion 531. The same applies to second through 30th bit portions (not shown) as bit portions 500, 501 and 531.

The 32 processing circuit groups G0–G31 are provided corresponding to the 32 storage elements 500–531. In other words, the 32 processing circuit groups G0–G31 are provided corresponding to the 32-bit data stored in register file 5. For example, 0th bit group G0 is provided corresponding to 0th bit portion 500 of register file 5. First bit group G1 is provided corresponding to first bit portion 501 of register file 5. The 31st bit group G31 is provided corresponding to 31st bit portion 531 of register file 5. Second through 30th bit groups (not shown) are provided similarly to bit groups G0, G1 and G31.

The 32 processing circuit groups G0–G31 are arranged on one side of register file 5 in the same direction as the longitudinal direction of register file 5. Each processing circuit group consists of four processing circuits. For example, 0th processing circuit group (0th bit group) G0 consists of four processing circuits (0th bit portions) 100, 200, 300 and 400. First processing circuit group (the first bit group) G1 consists of four processing circuits (first bit portions) 101, 201, 301 and 401. The 31st processing circuit group (31st bit group) G31 consists of four processing circuits (31st bit portions) 131, 231, 331 and 431. The second through 30th processing circuit groups (second through 30th bit groups) (not shown) are structured similarly to the above processing circuit groups G0, G1 and G31.

Although widths of these bit portions 100–131, 200–231, 300–331, and 400–431 are shown as partially unequal, all widths are equal.

The 0th–31st bit portions 100–131 form one functional unit. The 0th–31st bit portions 200–231 form another functional unit. The 0th–31st bit portions 300–331 form still another functional unit. The 0th–31st bit portions 400–431 form a further functional unit. Therefore, this microprocessor includes four functional units so that it can process four instructions in parallel.

More specifically, the four processing circuits forming each processing circuit group are provided corresponding to four instructions, so that responsive to the four instructions they can process data in parallel, each processing the corresponding 1-bit data of the 32-bit data. For example, first bit portion 100 is provided corresponding to a first instruction, and processes 1-bit data stored in 0th bit portion 500 of register file 5 in response to the first instruction. The 0th bit portion 200 is provided corresponding to a second instruction, and processes data of 1 bit stored in 0th bit portion 500 of register file 5 in response to the second instruction. The 0th bit portion 300 is provided corresponding to a third instruction, and processes data of 1 bit stored in 0th bit portion 500 of register file 5 in response to the third instruction. The 0th bit portion 400 is provided corresponding to a fourth instruction, and processes data of 1 bit stored in 0th bit portion 500 of register file 5 in response to the fourth instruction.

First bit portion 101 is provided corresponding to the first instruction, and processes data of 1 bit stored in first bit portion 501 in response to the first instruction. First bit portion 201 is provided corresponding to the second instruction, and processes data of 1 bit stored in first bit portion 501 in response to the second instruction. First bit portion 301 is provided corresponding to the third instruction, and processes data of 1 bit stored in first bit portion 501 in response to the third instruction. First bit portion 401 is provided corresponding to the fourth instruction, and processes data of 1 bit stored in first bit portion 501 in response to the fourth instruction.

The 31st bit portion 131 is provided corresponding to the first instruction, and processes data of 1 bit stored in 31st bit portion 531 in response to the first instruction. The 31st bit portion 231 is provided corresponding to the second instruction, and processes data of 1 bit stored in 31st bit portion 531 in response to the second instruction. The 31st bit portion 331 is provided corresponding to the third instruction, and processes data of 1 bit stored in 31st bit portion 531 in response to the third instruction. The 31st bit portion 431 is provided corresponding to the fourth instruction, and processes data of 1 bit stored in 31st bit portion 531 in response to the fourth instruction.

The same applies to the second through 30th bit portions as the 0th, 1st and 31st bit portions.

Figure 11:
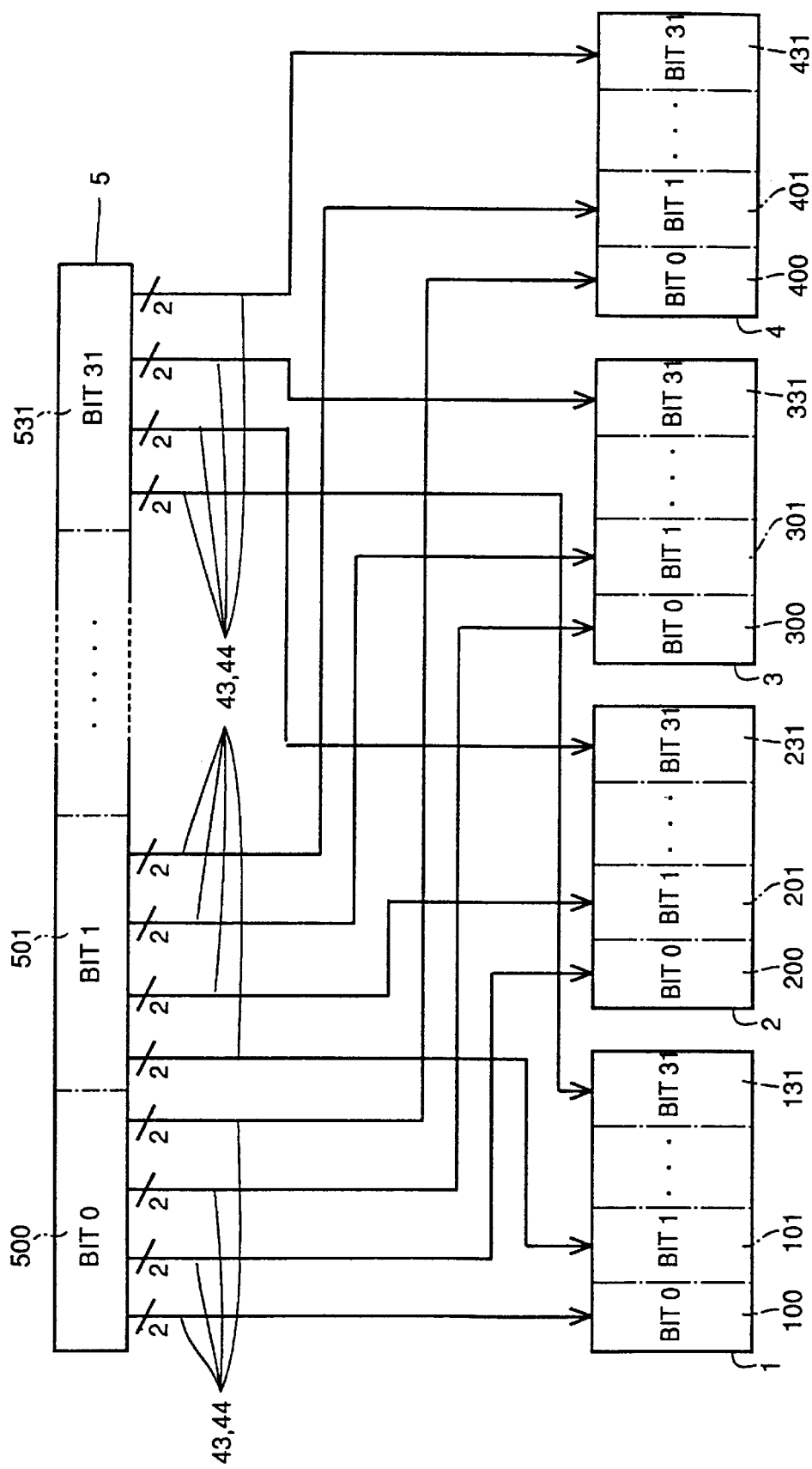
FIG. 11 shows a possible layout of a parallel processing microprocessor including a plurality of functional units, which clarifies the problems to be solved by the present invention.

The 0th bit portion 100 shown in FIG. 1 corresponds to 0th bit portion 100 of functional unit 1 shown in FIG. 11. The 0th bit portion 200 shown in FIG. 1 corresponds to 0th bit portion 200 of functional unit 2 shown in FIG. 11. The 0th bit portion 300 shown in FIG. 1 corresponds to 0th bit portion 300 of functional unit 3 shown in FIG. 11. The 0th bit portion 400 shown in FIG. 1 corresponds to 0th bit portion 400 of functional unit 4 shown in FIG. 11. Therefore, the four functional units 1–4 shown in FIG. 11 are sliced bit by bit and 0th bit group G0 is formed by collecting the four 0th bit portions 100, 200, 300 and 400 from the sliced bit portions. First bit group G1 is formed by collecting only the four first bit portions 101, 201, 301 and 401 from the sliced bit portions. The 31st bit group G31 is formed by collecting only the four 31st bit portions 131, 231, 331, and 431 from the sliced bit portions. The second through 30th bit groups are formed in a similar manner as bit groups G0, G1 and G31.

Figure 9:
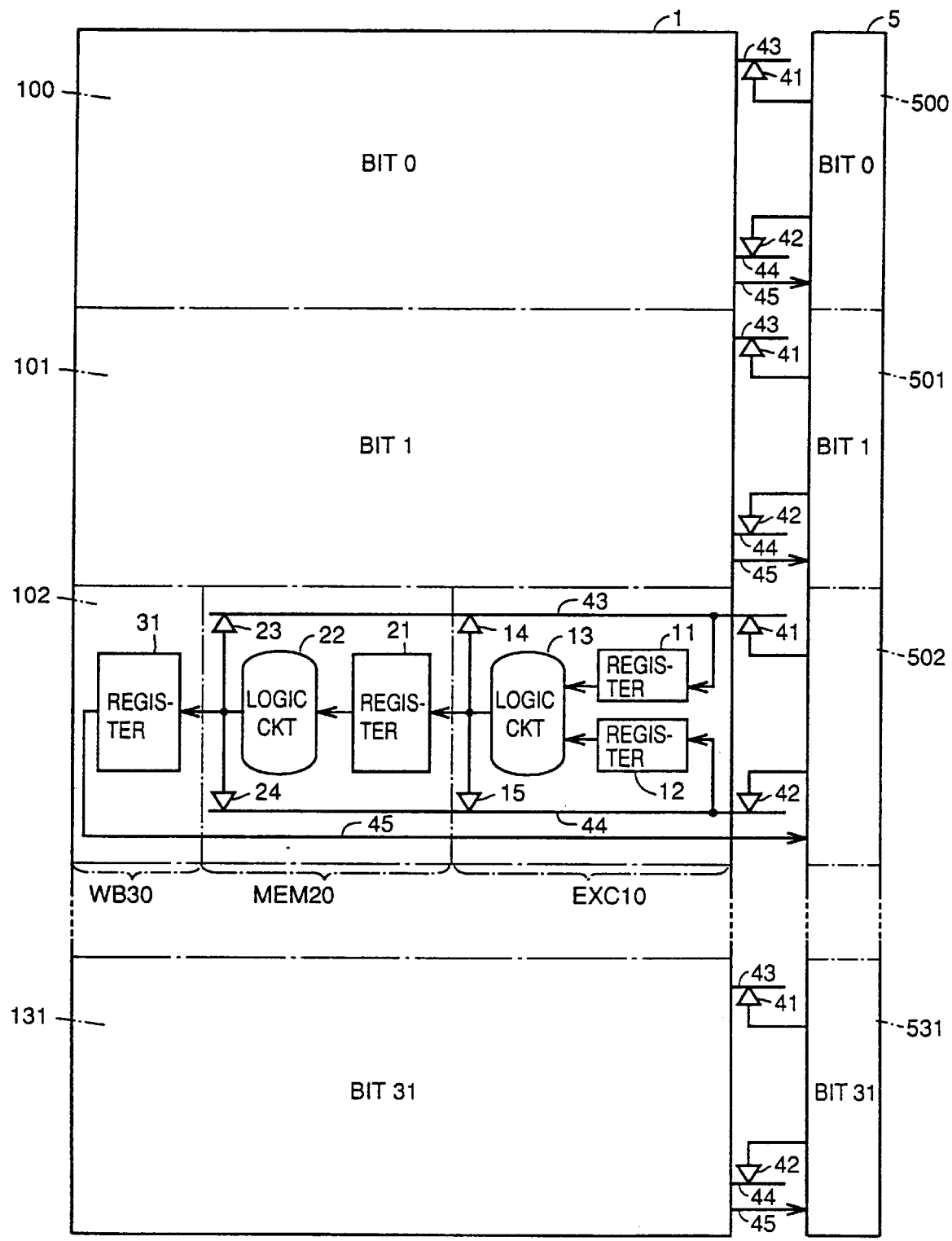
FIG. 9 shows a layout of a conventional microprocessor including one functional unit.
Figure 10:
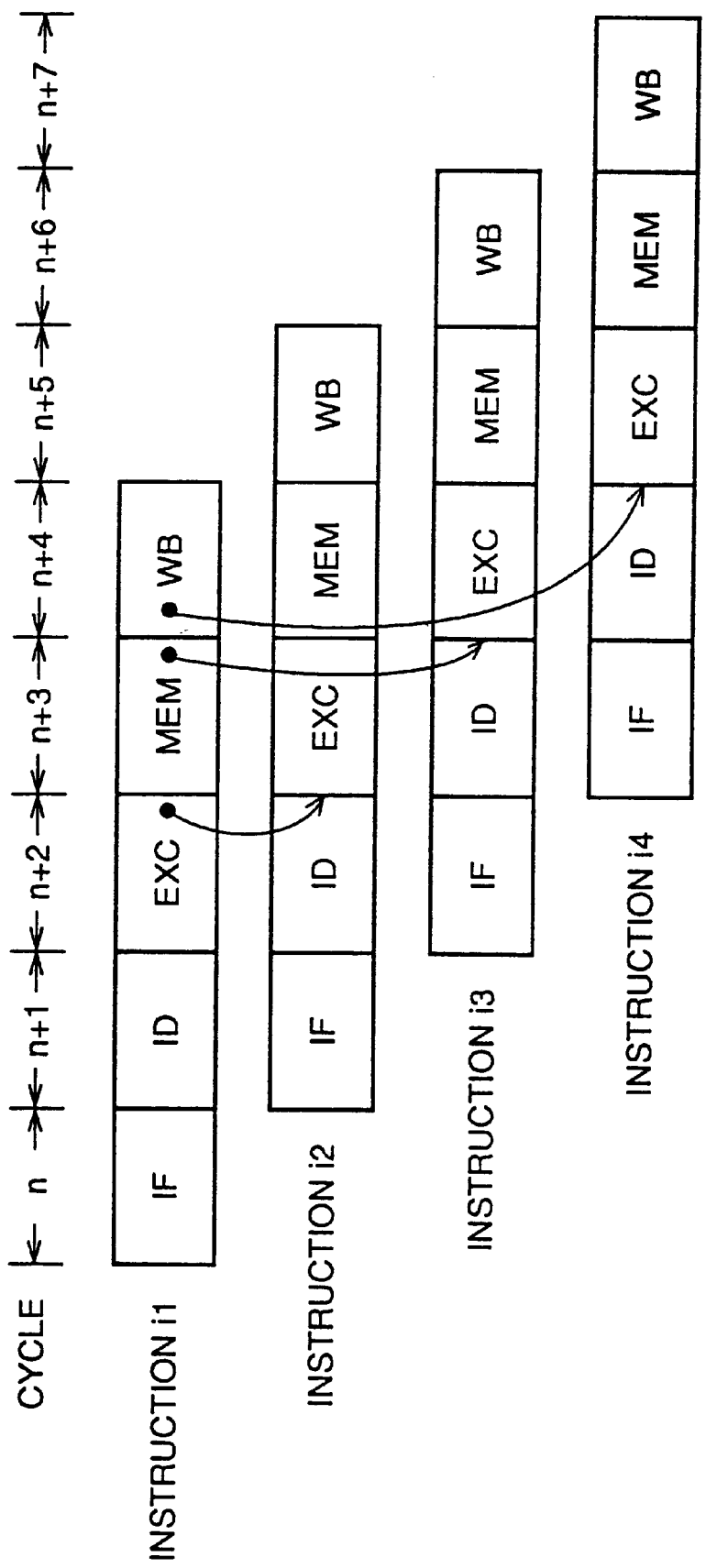
FIG. 10 is a timing chart showing pipeline operations of the microprocessor shown in FIG. 9.

Each processing circuit (bit portion) is pipelined similarly to each processing circuit in FIG. 9 and consists of three pipeline stages 10, 20 and 30. Although only the pipeline stages of first bit portion 301 in first bit group G1 are shown in FIG. 1, other bit portions are pipelined similarly to first bit portion 301.

First bit portion 301 consists of an execution stage 10 for executing an instruction, a memory stage 20 for reading out data from a memory, and a writeback stage 30 for writing back a resultant data to register file 5. Execution stage 10 includes registers 11 and 12, a logic circuit 13 formed by an ALU, and tristate buffers 14 and 15. Register 11 stores a 1-bit first source operand data provided from first bit portion 501 of register file 5 through a tristate buffer 41 and a supply bus 43. Register 12 stores a 1-bit second source operand data provided from first bit portion 501 of register file 5 through a tristate buffer 42 and a supply bus 44. Logic circuit 13 performs a logic operation of the data stored in registers 11 and 12. Tristate buffer 14 provides a resultant data from logic circuit 13 to supply bus 43. Tristate buffer 15 provides a resultant data from logic circuit 13 to supply bus 44.

Memory stage 20 includes a register 21, a logic circuit 22, and tristate buffers 23 and 24. Register 21 stores a 1-bit resultant data from logic circuit 13 in execution stage 10. Logic circuit 22 performs a logic operation of the data stored in register 21. Tristate buffer 23 provides a resultant data from logic circuit 22 to supply bus 43. Tristate buffer 24 provides a resultant data from logic circuit 22 to supply bus 44.

Writeback stage 30 includes a register 31. Register 31 stores a 1-bit resultant data from logic circuit 22 in memory stage 20. The data stored in register 31 is written back to first bit group 501 of register file 5 through a result bus 45.

If a resultant data from execution stage 10 in accordance with one instruction is required for executing the next instruction, only tristate buffer 14, for example, is rendered conductive, and tristate buffers 41 and 23 are rendered non-conductive. As a result, the resultant data from logic circuit 13 is provided through tristate buffer 14 and supply bus 43 to register 11.

If a resultant data from memory stage 20 in accordance with one instruction is required for executing a subsequent instruction, only tristate buffer 23, for example, is rendered conductive, and tristate buffers 41 and 14 are rendered non-conductive. As a result, the resultant data from logic circuit 22 is provided through tristate buffer 23 and supply bus 43 to register 11. In other words, tristate buffer 14 and supply bus 43 bypass memory stage 20, writeback stage 30 and register file 5. Tristate buffer 15 and supply bus 44 bypass memory stage 20, writeback stage 30 and register file 5. Tristate buffer 23 and supply bus 43 bypass writeback stage 30 and register file 5. Tristate buffer 24 and supply bus 44 bypass writeback stage 30 and register file 5.

As described above, in accordance with the first embodiment, four functional units are sliced bit by bit and the sliced bit portions are collected for each particular bit so that interconnections for connecting register file 5 and bit portions 100–131, 200–231, 300–331 and 400–431 are simplified as compared to those shown in FIG. 11. For example, the four 0th bit portions 100, 200, 300 and 400 are arranged collectively on one side of 0th bit portion 500 of register file 5, thereby reducing the silicon area occupied by tristate buffers 41 and 42, supply buses 43 and 44 and result bus 45 which connect 0th bit portion 500 with 0th bit portions 100, 200, 300 and 400. In this first embodiment all the interconnections are contained within the length of register file 5 so that interconnection cost will be substantially 0. As a result, an LSI chip equipped with this microprocessor will have a smaller size.

Furthermore, all the interconnections coupling register file 5 with a bit portion are equal in length, so that it takes the same time period to transfer data to any of the bit portions. Since particular bit portions are arranged collectively, the interconnections for connecting register file 5 and the particular bit portion is shortened, thereby enhancing data transfer rate between register file 5 and bit portions.

Although the above bit portions 100–131, 200–231, 330–331 and 400–431 are pipelined, they may not be pipelined, in which case each bit portion of the register file is connected directly to a register in each processing circuit.

Embodiment 2

Figure 2:
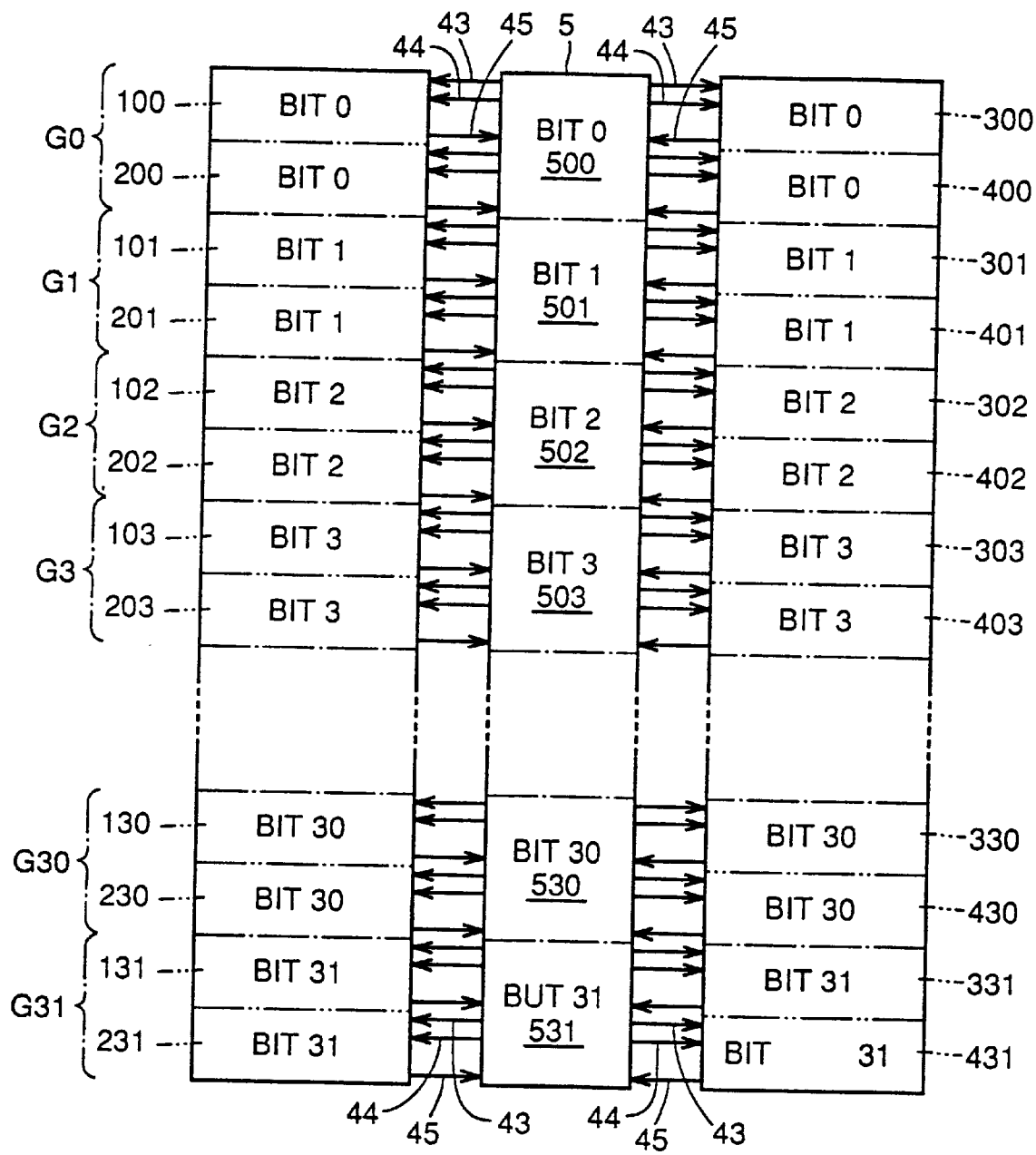

FIG. 2 shows a layout of a microprocessor in accordance with a second embodiment of the present invention. The second embodiment differs from the above-described first embodiment in that four processing circuits constituting each processing circuit group are arranged on both sides of register file 5, two on each side. For example, 0th bit portions 100 and 200 of the 0th bit group (the 0th processing circuit group) are arranged on the left side of 0th bit portion 500 in register file 5, and 0th bit portions 300 and 400 are arranged on the right side of 0th bit portion 500 in register file 5, as viewed in the figure. First bit portions 101 and 201 of first bit group G1 are arranged on the left side, and first bit portions 301 and 401 are arranged on the right side of first bit portion 501 in register file 5, in the figure. The same applies to second through 31st bit groups G2–G31 as bit groups G0 and G1.

Generally, each bit portion of a functional unit has more transistors than each bit portion of register file 5. Therefore, in the first embodiment of FIG. 1, it is not easy to make the total width of four bit portions forming each bit group equal to each bit portion of register file 5. Usually the total width of four bit portions forming each bit group is wider than the width of each bit portion of register file 5.

In the second embodiment, a width of the corresponding bit group can be made equal to that of each bit portion of register file 5, so that register file 5 and bit portions 100–131, 200–231, 300–331 and 400–431 can be arranged more efficiently. In addition, all interconnections coupling register file 5 with a bit portion are equal in length, whereby data can be transferred over the same time period to any of the bit portions.

Embodiment 3

Figure 3:
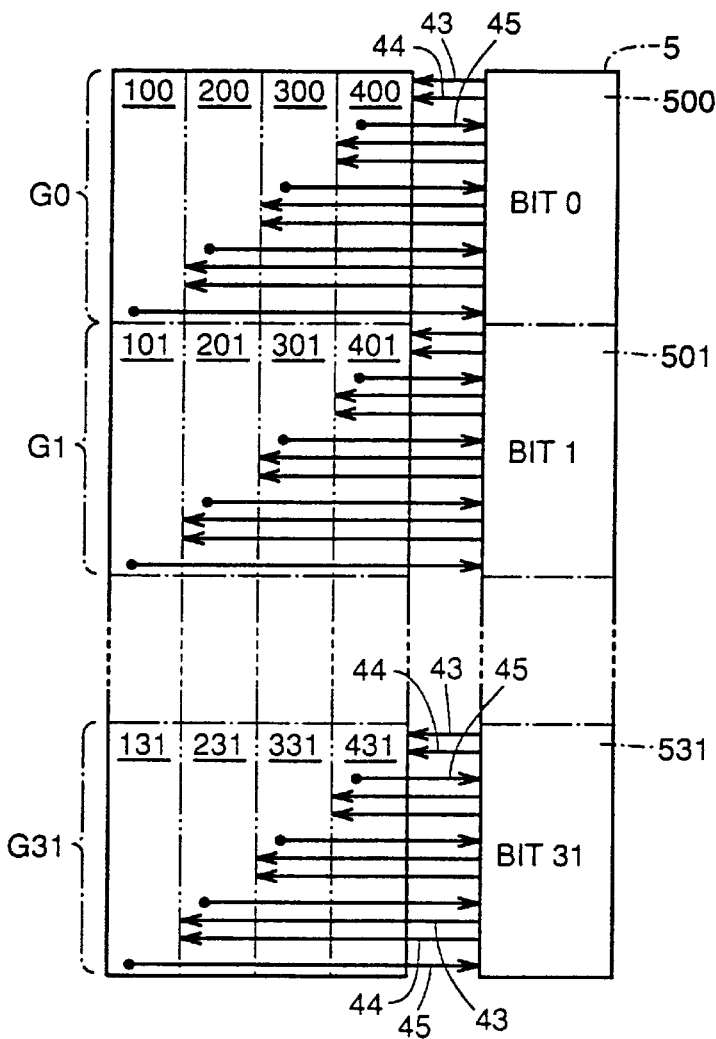

FIG. 3 shows a layout of a microprocessor in accordance with a third embodiment of the present invention. The third embodiment is different from the first embodiment in that four bit portions constituting each bit group are arranged perpendicularly to the longitudinal direction of register file 5.

Although the 32 bit groups G0–G31 are arranged in the same direction as the longitudinal direction of register file 5, four bit portions constituting each bit group are arranged perpendicularly to the longitudinal direction of register file 5. For example, four 0th bit portions 100, 200, 300 and 400 of 0th bit group G0 are arranged perpendicularly to the longitudinal direction of register file 5 on the left side of 0th bit portion 500 of register file 5 as viewed in the figure. The four first bit portions 101, 201, 301 and 401 of first bit group G1 are arranged perpendicularly to the longitudinal direction of register file 5 on the left side of first bit portion 501 of register file 5 as viewed in the figure. Four 31st bit portions 131, 231, 331, and 431 of 31st bit group G31 are arranged perpendicularly to the longitudinal direction of register file 5 on the left side of 31st bit portion 531 of register file 5 as viewed in the figure. Second through 30th bit groups (not shown) are arranged similarly to bit groups G0, G1 and G31 described above.

Supply buses 43 and 44 and result bus 45 for connecting 0th bit portion 100 and 0th bit portion 500 are formed on 0th bit portions 200, 300 and 400 and between 0th bit portion 500 and 0th bit group G0. Buses 43–45 for connecting 0th bit portion 200 and 0th bit portion 500 are formed on 0th bit portions 300 and 400 and between 0th bit portion 500 and 0th bit group G0. Buses 43–45 for connecting 0th bit portion 300 and 0th bit portion 500 are formed on 0th bit portion 400 and between 0th bit portion 500 and 0th bit group G0. Buses 43–45 for connecting 0th bit portion 400 and 0th bit portion 500 are formed between 0th bit portion 500 and 0th bit group G0. Buses 43–45 of first through 31st bit groups G1–G31 are formed in a similar manner to buses 43–45 of the above 0th bit group G0.

In the third embodiment, all bit portions 100–131, 200–231, 300–331 and 400–431 can be arranged efficiently, provided that each bit portion of register file 5 and each bit portion of a functional unit are equal in length. As a result, an LSI chip equipped with such a microprocessor is reduced in size. In the case of a microprocessor including more than five functional units, each bit group can be formed by five bit portions and the five bit portions are arranged perpendicularly to the longitudinal direction of the register file. Therefore, the present embodiment provides a simple layout for a microprocessor regardless of the number of functional units.

Furthermore, the area occupied by buses 43–45 is sufficiently small because the total width of buses 43–45 for connecting each bit portion of register file 5 and each bit group is within the length of each bit portion of register file 5. Furthermore, since buses 43–45 are formed on bit portions of bit groups, interconnection cost will be substantially 0.

Embodiment 4

Figure 4:
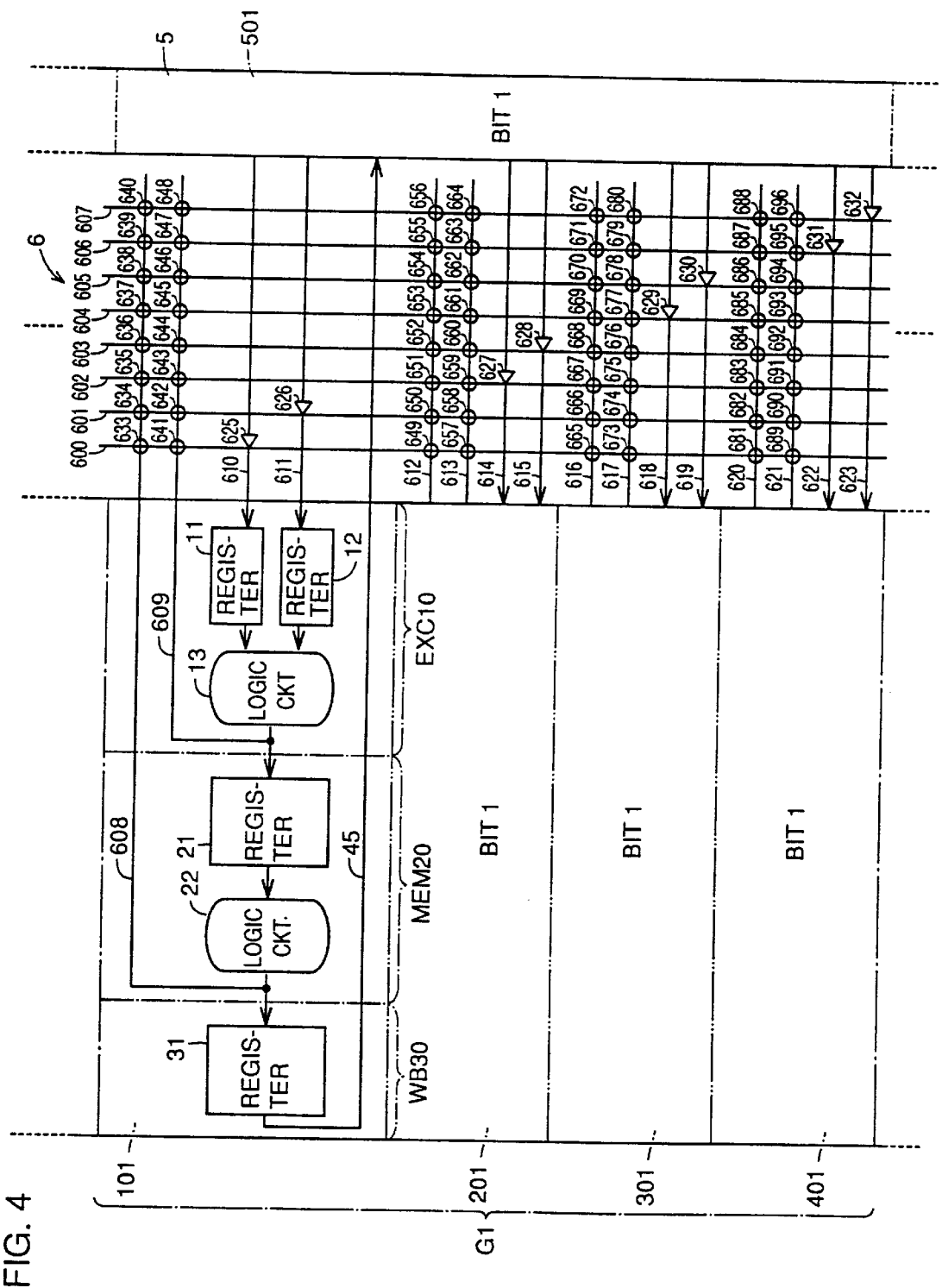
FIG. 4 shows a layout of a portion of a parallel processing microprocessor in accordance with a fourth embodiment of the present invention.

FIG. 4 shows a layout of a part of a microprocessor in accordance with a fourth embodiment of the present invention. The fourth embodiment differs from the above-described first embodiment in that a bypass circuit 6 is provided between register file 5 and the 32 bit groups.

More specifically, this microprocessor includes a plurality of bypass circuits. Each bypass circuit is formed between the corresponding bit portion of register file 5 and the corresponding bit group. Only first bit portion 501 of the 32 bit portions of register file 5 is shown in FIG. 4, and first bit group G1 of the 32 bit groups is shown. Thus, bypass circuit 6 is located between first bit portion 501 of register file 5 and first bit group G1. A bypass circuit (not shown) is also formed between 0th bit portion (not shown) of register file 5 and 0th bit group (not shown). Respective bypass circuits (not shown) are formed between second through 31st bit portions (not shown) of the register file and second through 31st bit groups (not shown).

Although only first bit portion 101 is shown slightly wider than other portions in FIG. 4, all portions have an equal width.

Bypass circuit 6 includes eight transfer buses 600–607, eight extraction buses 608–621, eight supply buses 610–623, eight tristate buffers 625–632 provided in the supply buses, and 64 tristate buffers 633–696 provided at crossings of transfer buses and extraction buses.

Transfer bus 600 provides a first source operand to register 11 of first bit portion 101. Transfer bus 601 provides a second source operand to register 12 of first bit portion 101. Transfer bus 602 provides a first source operand to a register (not shown) of first bit portion 201. Transfer bus 603 provides a second source operand to a register (not shown) of first bit portion 201. Transfer bus 604 provides a first source operand to a register (not shown) of first bit portion 301. Transfer bus 605 provides a second source operand to a register (not shown) of first bit portion 301. Transfer bus 606 provides a first source operand to a register (not shown) of first bit portion 401. Transfer bus 607 provides a second source operand to a register (not shown) of first bit portion 401.

Extraction bus 608 has one end connected to an output node of logic circuit 22 in memory stage 20, and the other end selectively connected to the corresponding one of eight transfer buses 600–607 through one of eight tristate buffers 633–640.

Figure 5:
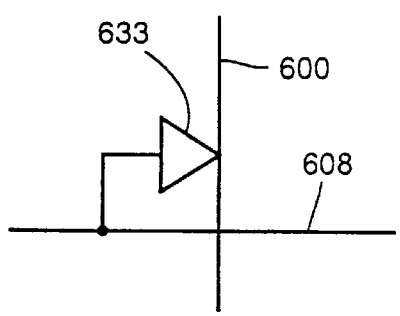
FIG. 5 is a circuit diagram specifically showing a tristate buffer in the parallel processing microprocessor shown in FIG. 4.

FIG. 5 specifically shows tristate buffer 633, transfer bus 600 and extraction bus 608 shown in FIG. 4. Referring to FIG. 5, tristate buffer 633 has an input node connected to extraction bus 608 and an output node connected to transfer bus 600. As a result, when tristate buffer 633 is activated, the logic level of extraction bus 608 is provided to transfer bus 600 through tristate buffer 633. More specifically, when the potential of extraction bus 608 attains an H (High) level, the potential of transfer bus 600 also attains an H level. When the potential of extraction bus 608 attains an L (Low) level, the potential of transfer bus 600 also attains an L level.

Meanwhile, when tristate buffer 633 is inactivated, the output node thereof is brought into a high impedance state. If the tristate buffer is inactivated, the potential of transfer bus 600 does not change with the change in potential of extraction bus 608.

Although only tristate buffer 633 is shown in FIG. 5, other tristate buffers 634–696 are constructed similarly to tristate buffer 633.

Extraction bus 609 has one end connected to an output node of logic circuit 13 in execution stage 10 of first bit portion 101, and the other end selectively connected to one transfer bus through one of eight tristate buffers 641–648.

Extraction bus 612 has one end connected to an output node of a logic circuit (not shown) in a memory stage (not shown) of first bit portion 201, and the other end selectively connected to one transfer bus through one of eight tristate buffers 649–656.

Extraction bus 613 has one end connected to an output node of a logic circuit (not shown) in an execution stage (not shown) of first bit portion 201, and the other end selectively connected to one transfer bus through one of eight tristate buffers 657–664. Extraction bus 616 has one end connected to an output node of a logic circuit (not shown) in a memory stage (not shown) of first bit portion 301, and the other end selectively connected to one transfer bus through one of eight tristate buffers 665–672.

Extraction bus 617 has one end connected to an output node of a logic circuit (not shown) in an execution stage (not shown) of first bit portion 301, and the other end selectively connected to one transfer bus through one of eight tristate buffers 673–680. Extraction bus 620 has one end connected to an output node of a logic circuit (not shown) in a memory stage (not shown) of first bit portion 401, and the other end selectively connected to one transfer bus through one of eight tristate buffers 681–688.

Extraction bus 621 has one end connected to an output node of a logic circuit (not shown) in an execution stage (not shown) of first bit portion 401, and the other end selectively connected to one transfer bus through one of eight tristate buffers 689–696.

Supply bus 610 is connected between first bit portion 501 of register file 5 and one register 11 in execution stage 10 of first bit portion 101. Supply bus 610 is also connected to transfer bus 600. Supply bus 611 is connected between first bit portion 501 of register file 5 and the other register 12 in execution stage 10 of first bit portion 101. Supply bus 611 is also connected to transfer bus 601.

Supply bus 614 is connected between first bit portion 501 and one register (not shown) in an execution stage (not shown) of first bit portion 201. Supply bus 614 is also connected to transfer bus 602. Supply bus 615 is connected between first bit portion 501 and the other register (not shown) in an execution stage (not shown) of first bit portion 201. Supply bus 615 is also connected to transfer bus 603.

Supply bus 618 is connected between first bit portion 501 and one register (not shown) in an execution stage (not shown) of first bit portion 301. Supply bus 618 is also connected to transfer bus 604. Supply bus 619 is connected between first bit portion 501 and the other register (not shown) in an execution stage (not shown) of first bit portion 301. Supply bus 619 is also connected to transfer bus 605.

Supply bus 622 is connected between first bit portion 501 and one register (not shown) in an execution stage (not shown) of first bit portion 401. Supply bus 622 is also connected to transfer bus 606. Supply bus 623 is connected between first bit portion 501 and the other register (not shown) in an execution stage (not shown) of first bit portion 401. Supply bus 623 is also connected to transfer bus 607.

In this microprocessor, when a resultant data of execution stage 10 in first bit portion 101 is to be transferred to first bit portion 301 as a second source operand, only tristate buffer 646 connected to extraction bus 609 is rendered conductive among the eight tristate buffers 638, 646, 654, 662, 670, 678, 686 and 694 for driving transfer bus 605. As a result, the resultant data of execution stage 10 in first bit portion 101 is provided to the other register (not shown) in an execution stage (not shown) of first bit portion 301 through extraction bus 609, tristate buffer 646, transfer bus 605 and supply bus 619. At this time, the other seven tristate buffers 638, 654, 662, 670, 678, 686 and 694 are in a non-conductive state, and therefore the potential of transfer bus 605 does not change with the change in potential of the corresponding extraction buses 608, 612, 613, 616, 617, 620 and 621.

In order to transfer a resultant data of execution stage 10 in the first bit portion as a second source operand to execution stage 10 of first bit portion 101 itself, only tristate buffer 642 connected to extraction bus 609 is rendered conductive among the eight tristate buffers for driving transfer bus 601. Consequently, the resultant data of execution stage 10 in first bit portion 101 is provided to the other register 12 in execution stage 10 of first bit portion 101 through extraction bus 609, tristate buffer 642, transfer bus 601 and extraction bus 611.

When data in first bit portion 501 of register file 5 is to be transferred to one register 11 in execution stage 10 of first bit portion 101, tristate buffer 625 is rendered conductive. As a result, data in first bit portion 501 is provided to register 11 through tristate buffer 625 and supply bus 610. When data in first bit portion 501 is to be transferred to the other register 12 in execution stage 10 of first bit portion 101, tristate buffer 626 is rendered conductive. Consequently, data in first bit portion 501 is provided to register 12 through tristate buffer 626 and supply bus 611.

Since data transfer operation among first bit portions 101–401, data transfer operation within each first bit portion (the first processing circuit) and data transfer operation between first bit portion 501 of register file 5 and first bit portions 101, 201, 301 and 401 are the same as the data transfer operation described above, detailed description thereof will not be repeated.

Figure 12:
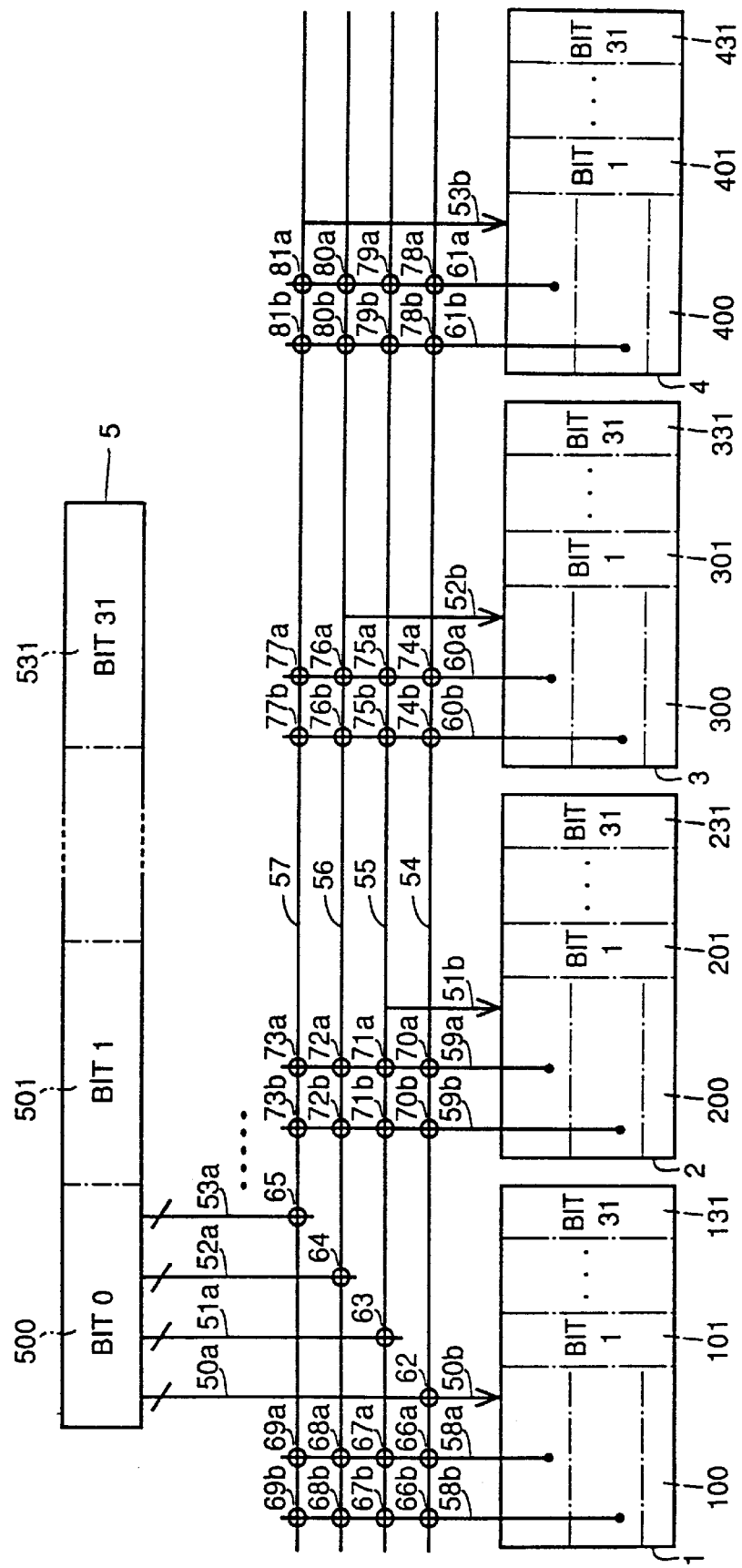
FIG. 12 shows a possible layout of a parallel processing microprocessor equivalent to the microprocessor shown in FIG. 11 with an additional bypass circuit which allows data transfer among functional units, clarifying the problems to be solved by the present invention.

It will be apparent from the comparison between FIG. 12 and FIG. 4 showing the fourth embodiment that the area occupied by bypass circuit 6 (including the bypass circuits which are not shown) is smaller than that of FIG. 12. More specifically, 32 groups formed by four transfer buses 54–57 are provided in parallel in FIG. 12, while 32 groups formed by eight transfer buses 600–607 are provided in series in FIG. 4.

Therefore, interconnection cost given by the above equation (1) equals to 8 in this embodiment with 4 functional units, 2 operands in total and 1 bit. Thus, an LSI chip equipped with such a microprocessor is sufficiently reduced in size. In addition, since each bus of the bypass circuit is short, data can be transferred in a short time.

Embodiment 5

Figure 6:
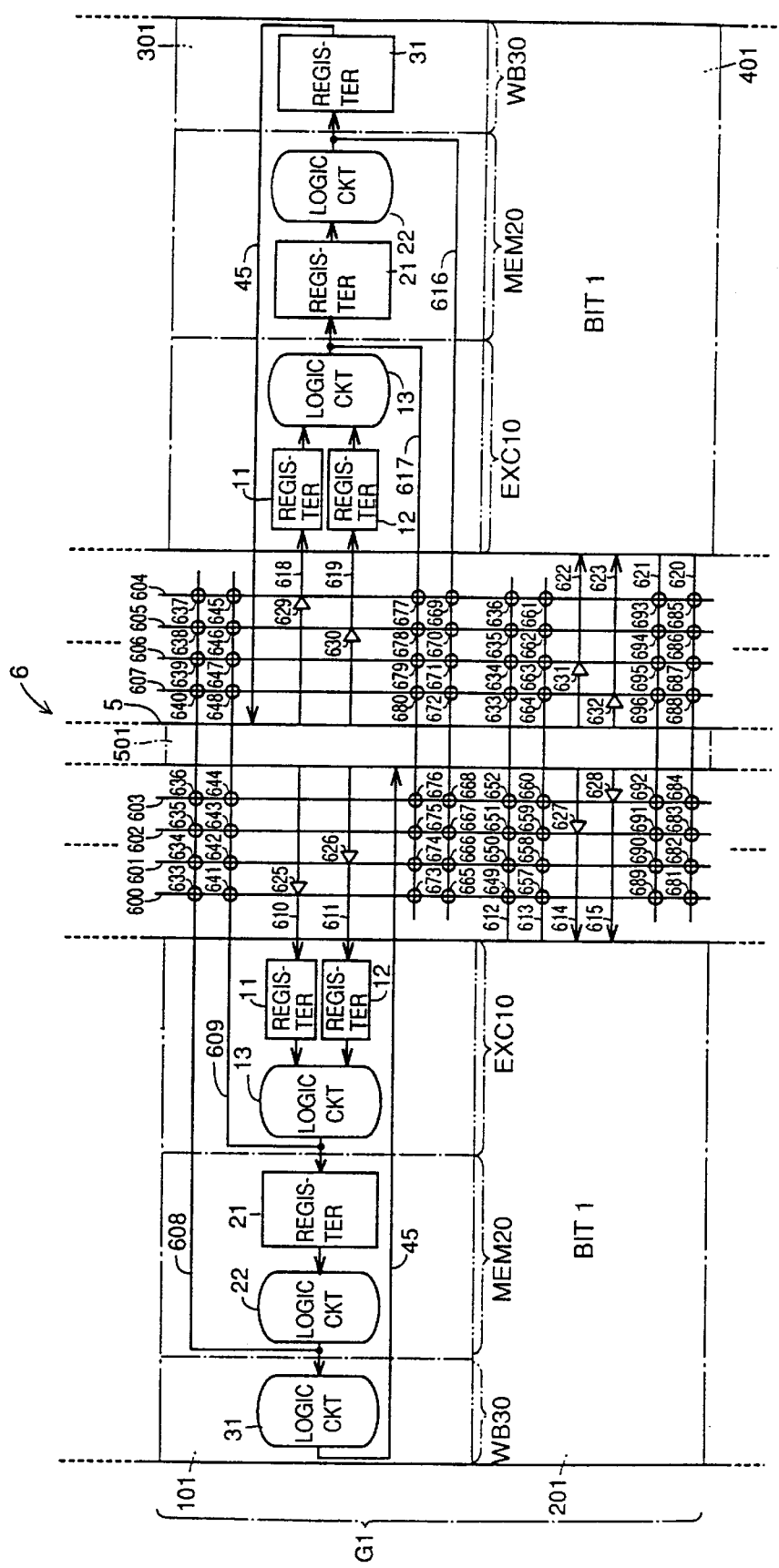
FIGS. 6, 7 and 8 show layouts of a portion of parallel processing microprocessors in accordance with fifth through seventh embodiments of the present invention.

FIG. 6 shows a layout of a portion of a microprocessor in accordance with a fifth embodiment of the present invention. The fifth embodiment differs from the above-described second embodiment in that a plurality of bypass circuits are provided. Although the plurality of bypass circuits are provided corresponding to a plurality of bit groups, FIG. 6 only shows bypass circuit 6 provided corresponding to first bit group G1. Also, although first bit portions 101 and 301 are shown slightly wider than other portions, all the portions are equal in width.

Referring to FIG. 6, bypass circuit 6 is arranged between the two first bit portions 101 and 201 on the left side of the figure and the two first bit portions 301 and 401 on the right side of the figure. Bypass circuit 6 includes eight transfer buses 600–607, eight extraction buses 608–621, eight supply buses 610–623, eight tristate buffers 625–632 provided in the supply buses, and 64 tristate buffers 633–696 provided at crossings of the transfer buses and extraction buses.

Transfer buses 600–603 are arranged between first bit portion 501 of register file 5 and two first bit portions 101 and 201 on the left side. Transfer buses 604–607 are arranged between first bit portion 501 of register file 5 and two first bit portions 301 and 401 on the right. Extraction buses 608–621 are arranged crossing transfer buses 600–607. As a result, a portion of extraction buses 608–621 is formed on first bit portion 501 of register file 5. Since register file 5 generally has fewer transistors than each bit portion of a functional unit, extraction buses 608–621 are easily formed on register file 5.

In this microprocessor, when a resultant data of execution stage 10 of first bit portion 101 is to be transferred as a second source operand to register 12 in execution stage 10 of first bit portion 301, only tristate buffer 646 connected to extraction bus 609 is rendered conductive among eight tristate buffers 638, 646, 678, 670, 654, 662, 694 and 686 for driving transfer bus 605. As a result, the resultant data of execution stage 10 of first bit portion 101 is provided to register 12 in execution stage 10 of first bit portion 301 through extraction bus 609, tristate buffer 646 and supply bus 619.

When a resultant data of execution stage 10 of first bit portion 101 is to be transferred to execution stage 10 of first bit portion 101 itself, only tristate buffer 642 is rendered conductive. Consequently, the resultant data of execution stage 10 of first bit portion 101 is provided to register 12 in execution stage 10 of first bit portion 101 through extraction bus 609, tristate buffer 642, transfer bus 601 and supply bus 611.

When data in first bit portion 501 of register file 5 is to be transferred to first bit portions 101, 201, 301 and 401, tristate buffers 625–632 are rendered conductive. Data in first bit portion 501 of register file 5 is provided to first bit portions 101, 201, 301 and 401 through tristate buffers 625–632 and supply buses 610–623, respectively.

In this fifth embodiment, the two corresponding bit portions (processing circuits) are arranged on both sides of each bit portion of register file 5, so that the total width of the corresponding two bit portions match the length of each bit portion of register file 5. Therefore, the silicon area occupied by the microprocessor of the fifth embodiment is smaller than that of the fourth embodiment.

In this fifth embodiment, interconnection cost given by the above equation (1) equals to 8 with four functional units, 2 source operands and 1 bit. An LSI chip equipped with this microprocessor is reduced in size because the area occupied by the bypass circuit is small. Furthermore, each bus of the bypass circuit is short, thereby allowing data transfer in a short time.

Embodiment 6

Figure 7:
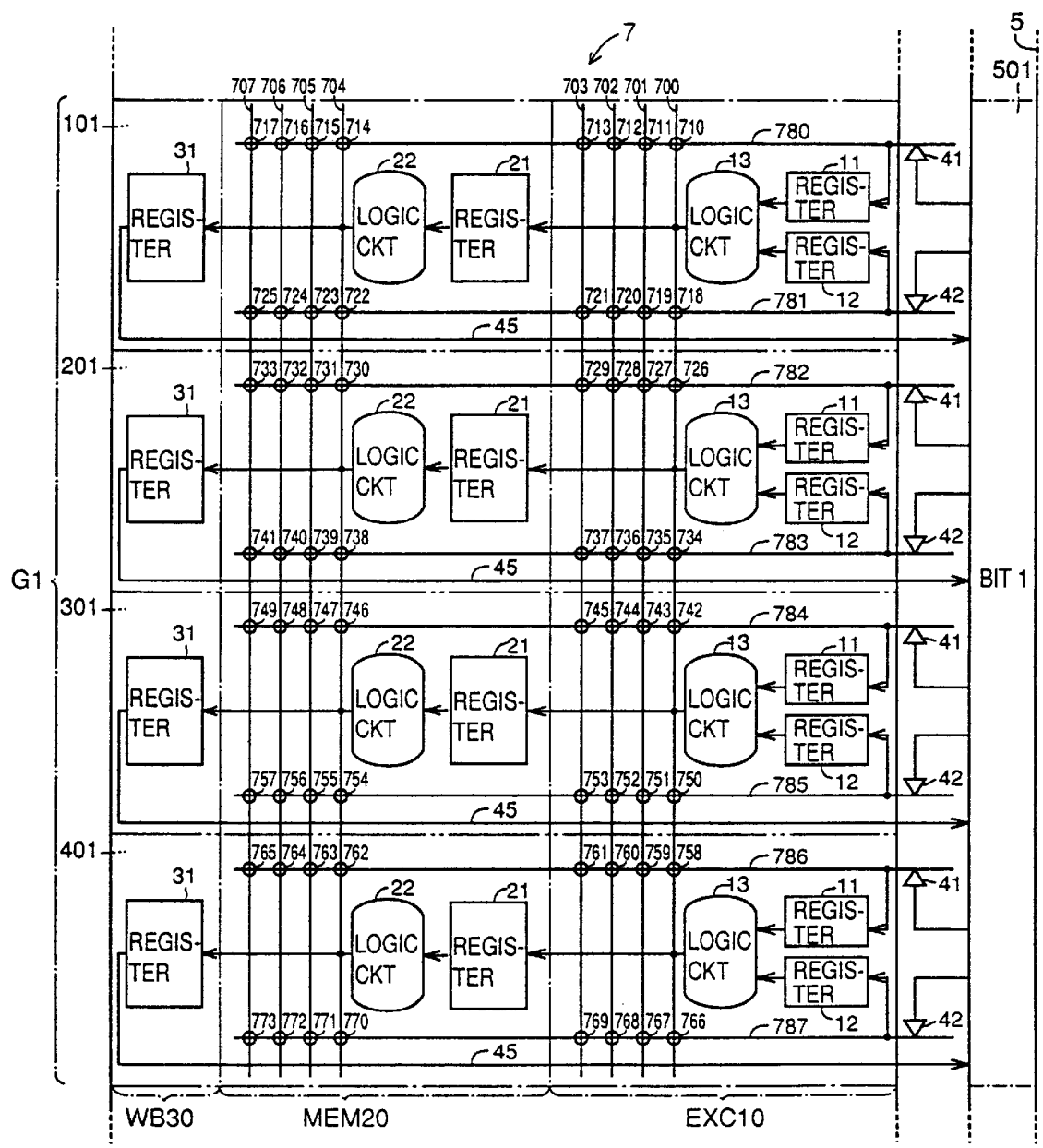

FIG. 7 shows a layout of a portion of a microprocessor in accordance with a sixth embodiment of the present invention. The difference between the sixth embodiment and the above-described first embodiment is that a plurality of bypass circuits are arranged. The sixth embodiment differs from the above-described fourth embodiment in that a bypass circuit is formed on a bit group (a processing circuit group).

Although the plurality of bypass circuits are provided corresponding to a plurality of bit groups in this sixth embodiment, FIG. 7 shows only a bypass circuit 7 provided corresponding to first bit group G1.

Bypass circuit 7 includes eight transfer buses 700–707, eight supply buses 780–787, and 64 tristate buffers provided at crossings of transfer buses and supply buses.

Transfer buses 700–707 cross four first bit portions 101, 201, 301 and 401 and formed on four first bit portions 101, 201, 301 and 401 by multi-layered interconnection technology. Transfer buses 700–703 are formed on execution stage 10. Transfer buses 704–707 are formed on memory stage 20.

Transfer bus 700 is connected to an output node of logic circuit 13 in execution stage 10 of first bit portion 101. Transfer bus 701 is connected to an output node of logic circuit 13 in execution stage 10 of first bit portion 201. Transfer bus 702 is connected to an output node of logic circuit 13 in execution stage 10 of first bit portion 301. Transfer bus 703 is connected to an output node of logic circuit 13 in execution stage 10 of first bit portion 401.

Transfer bus 704 is connected to an output node of logic circuit 22 in memory stage 20 of first bit portion 401. Transfer bus 705 is connected to an output node of logic circuit 22 in memory stage 20 of first bit portion 201. Transfer bus 706 is connected to an output node of logic circuit 22 in memory stage 20 of first bit portion 301. Transfer bus 707 is connected to an output node of logic circuit 22 in memory stage 20 of first bit portion 401.

Supply buses 780–787 are arranged crossing transfer buses 700–707. Supply buses 780 and 781 are arranged in first bit portion 101. Supply buses 782 and 783 are arranged in first bit portion 201. Supply buses 784 and 785 are arranged in first bit portion 301. Supply buses 786 and 787 are arranged in first bit portion 401.

Tristate buffers 710–773 are structured similarly to those shown in FIG. 5. For example, tristate buffer 710 is located at the crossing of transfer bus 700 and supply bus 780. Tristate buffer 710 has an input node connected to transfer bus 700 and an output node connected to supply bus 780. Tristate buffer 710 is selectively activated and, when activated, provides a potential of transfer bus 700 to supply bus 780. Other tristate buffers 711–773 have the structure similar to tristate buffer 710.

In this microprocessor, when a resultant data of execution stage 10 of first bit portion 101 is to be provided as a second source operand to the execution stage of first bit portion 301, tristate buffer 750 connected to transfer bus 700 is rendered conductive among the eight tristate buffers 750–757 for driving supply bus 785. Tristate buffer 42 for driving supply bus 785 is rendered non-conductive. As a result, the resultant data of execution stage 10 of first bit portion 101 is provided to register 12 in execution stage 10 of first bit portion 301 through transfer bus 700, tristate buffer 750 and supply bus 785.

When a resultant data of execution stage 10 of first bit portion 101 is to be provided to execution stage 10 of first bit portion 101 itself, only tristate buffer 710 is rendered conductive. As a result, the resultant data of execution stage 10 of first bit portion 101 is provided to register 11 in execution stage 10 of first bit portion 101 through tristate buffer 710 and supply bus 780.

When data in first bit portion 501 of register file 5 is to be provided to first bit portions 101, 201, 301 and 401, tristate buffers 41 and 42 are rendered conductive. Consequently, for a first bit portion 101 for example, data in first bit portion 501 of register file 5 is provided to register 11 in execution stage 10 through tristate buffer 41 and supply bus 780, and to register 12 through tristate buffer 42 and supply bus 781. Regarding other first bit portions 201, 301 and 401 as well, data in first bit portion 501 is provided to registers 11 and 12 similarly to first bit portion 101.

Since bypass circuit 7 is formed on first bit portions 101, 201, 301 and 401 by multi-layered interconnection technology or the like in this sixth embodiment, the area occupied by the microprocessor is equal to or only slightly larger than the first embodiment described above. The occupied area by the microprocessor is smaller than that in the fourth embodiment. Interconnection cost in the sixth embodiment is almost, or equal to, zero. Therefore, an LSI chip equipped with this microprocessor is sufficiently reduced in size.

Embodiment 7

Figure 8:
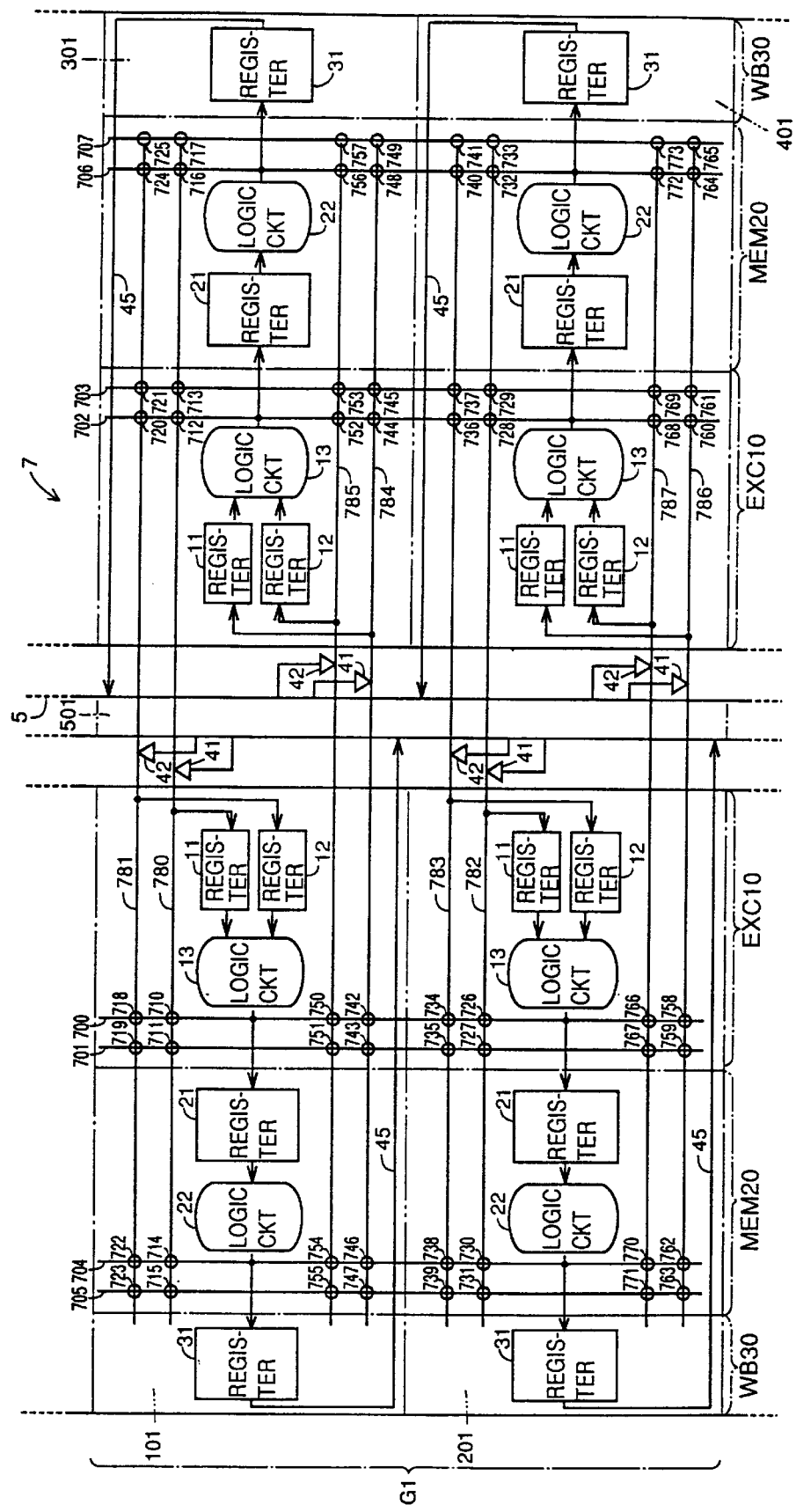

FIG. 8 shows a layout of a portion of a microprocessor in accordance with a seventh embodiment of the present invention. The seventh embodiment differs from the above-described second embodiment in that a bypass circuit is provided, and it differs from the fifth embodiment described above in that a bypass circuit is not formed between bit portions located on both sides of the register file but formed on these bit portions. The seventh embodiment is also different from the sixth embodiment described above because four bit portions constituting each bit group are not located on one side of the register file but located on both sides of the register file, two on each side.

This microprocessor includes a plurality of bypass circuits provided corresponding to a plurality of bit groups. In FIG. 8, only bypass circuit 7 provided corresponding to first bit group G1 is shown. This bypass circuit 7 includes eight transfer buses 700–707, eight supply buses 780–787, 64 tristate buffers 710–773 provided at the crossings of transfer buses and supply buses.

Transfer buses 700 and 701 are formed on execution stage 10 of first bit portions 101 and 201 and extending in the same direction as the longitudinal direction of register file 5. Transfer bus 700 is connected to an output node of logic circuit 13 in execution stage 10 of first bit portion 101. Transfer bus 701 is connected to an output node of logic circuit 13 in execution stage 10 of first bit portion 201.

Transfer buses 702 and 703 are formed on execution stage 10 of first bit portions 301 and 401 and extending in the same direction as the longitudinal direction of register file 5. Transfer bus 702 is connected to an output node of a logic circuit 13 in execution stage 10 of first bit portion 301. Transfer bus 703 is connected to an output node of logic circuit 13 in execution stage 10 of first bit portion 401.

Transfer buses 704 and 705 are formed on first bit portions 101 and 201 and extending in the same direction as the longitudinal direction of register file 5. Transfer bus 704 is connected to an output node of logic circuit 22 in memory stage 20 of first bit portion 101. Transfer bus 705 is connected to an output node of logic circuit 22 in memory stage 20 of first bit portion 201.

Transfer buses 706 and 707 are formed on memory stage 20 of first bit portions 301 and 401 and extending in the same direction as the longitudinal direction of register file 5. Transfer bus 706 is connected to an output node of logic circuit 22 in memory stage 20 of first bit portion 301. Transfer bus 707 is connected to an output node of logic circuit 22 in memory stage 20 of first bit portion 401.

Supply buses 780, 781, 784 and 785 are formed on first bit portions 101 and 301 and register file 5, and extending perpendicularly to the longitudinal direction of register file 5. Supply buses 782, 783, 786 and 787 are formed on first bit portions 201 and 401 and register file 5, and extending perpendicularly to the longitudinal direction of register file 5.

Tristate buffers 710–773 have a similar structure as those shown in FIG. 5. For example, tristate buffer 710 has an input node connected to transfer bus 700 and an output node connected to supply bus 780. Other tristate buffers 711–773 are structured similarly to tristate buffer 710.

The bypass circuits provided corresponding to other bit groups are structured similarly to bypass circuit 7, though not shown.

In this microprocessor, when a resultant data of execution stage 10 of first bit portion 101 is to be provided to register 11 in execution stage 10 of first bit portion 301, tristate buffer 742 connected to transfer bus 700 is rendered conductive among eight tristate buffers 742–749 for driving supply bus 784. As a result, the resultant data of execution stage 10 of first bit portion 101 is provided to register 11 in execution stage 10 of first bit portion 301 through transfer bus 700, tristate buffer 742, and supply bus 784.

When a resultant data of execution stage 10 of first bit portion 101 is to be provided to register 11 in execution stage 10 of the first bit portion 101 itself, only tristate buffer 710 is rendered conductive. Consequently, the resultant data of execution stage 10 of first bit portion 101 is provided to register 11 in execution stage 10 of first bit portion 101 through tristate buffer 710 and supply bus 780.

When data in first bit portion 501 of register file 5 is to be provided to first bit portions 101, 201, 301 and 401, tristate buffers 41 and 42 are rendered conductive. In first bit portion 101 for example, data in first bit portion 501 of register file 5 is provided to register 11 through tristate buffer 41 and supply bus 780, and to register 12 through tristate buffer 42 and supply bus 781. In the other first bit portions 201, 301 and 401 as well, data in first bit portion 501 of register file 5 is provided to registers 11 and 12 in a similar manner to first bit portion 101.

In this seventh embodiment, since four bit portions constituting each bit group are arranged on both sides of register file 5 with two bit portions on each side, the total width of the corresponding two bit portions match the length of each bit portion of register file 5. Therefore, register file 5 and the plurality of bit portions can be more sufficiently arranged than, for example, the above sixth embodiment.

Each bypass circuit is formed on register file 5 and four bit portions constituting the corresponding bit group, thereby reducing the area required for a bypass circuit as compared to, say, the fifth embodiment. Interconnection cost is equal to, or almost zero in this seventh embodiment. Therefore, an LSI chip equipped with the microprocessor in accordance with the seventh embodiment is sufficiently reduced in size.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microprocessor for executing in parallel a plurality of instructions, comprising:

a register file having a plurality of storage elements each for storing a plurality of data; and a plurality of bit sliced circuit groups provided corresponding to said plurality of storage elements, each bit sliced circuit group having a plurality of bit sliced circuits corresponding to said plurality of instructions, arranged closely to each other and coupled to a corresponding one of said storage elements; wherein a respective one of said bit sliced circuits forming one of said bit sliced circuit groups and a corresponding one of said bit sliced circuit forming another one of said bit sliced circuit groups form a respective functional unit for processing data supplied from said register file in accordance with a corresponding one of said instructions.

2. The microprocessor according to claim 1, wherein said plurality of bit sliced circuit groups are arranged on one side of said register file in a longitudinal direction common with a longitudinal direction of said register file, and said plurality of bit sliced circuits are arranged in the longitudinal direction of said register file.

3. The microprocessor according to claim 1, wherein said plurality of bit sliced circuit groups are arranged in a longitudinal direction common with a longitudinal direction of said register file, a first half of said bit sliced circuits forming each of said bit sliced circuit groups are arranged on a first side of said register file in the longitudinal direction of said register file, and a second half of said bit sliced circuits are arranged on a second side of said register file, opposing the first side, in the longitudinal direction of said register file.

4. The microprocessor according to claim 1, wherein said plurality of bit sliced circuit groups are arranged in a longitudinal direction common with a longitudinal direction of said register file, and said plurality of bit sliced circuits are arranged perpendicularly to the longitudinal direction of said register file.

5. The microprocessor according to claim 1, wherein each of said bit sliced circuits is pipelined and includes a plurality of pipeline stages for sequentially processing a corresponding data, said microprocessor further comprising a plurality of bypass circuits provided corresponding to said plurality of bit sliced circuit groups and each supplying processed data in one of the pipeline stages in the plurality of bit sliced circuits forming a corresponding bit sliced circuit group to the corresponding plurality of bit sliced circuits.

6. The microprocessor according to claim 5, wherein said plurality of bit sliced circuit groups are arranged on one side of said register file in a longitudinal direction common with a longitudinal direction of said register file, and said plurality of bit sliced circuits are arranged in the longitudinal direction of said register file.

7. The microprocessor according to claim 6, wherein each of said bypass circuits is arranged between said register file and a corresponding bit sliced circuit group.

8. The microprocessor according to claim 6, wherein each of said bypass circuits is arranged on said plurality of bit sliced circuits forming a corresponding bit sliced circuit group.

9. The microprocessor according to claim 5, wherein said plurality of groups of bit sliced circuits are arranged in a longitudinal direction common with a longitudinal direction of said register file, a first one half of said bit sliced circuits forming each of said bit sliced circuit groups are arranged on a first side of said register file in the longitudinal direction of said register file, and a second half of the bit sliced circuits are arranged on a second side of said register file, opposing the first side, in the longitudinal direction of said register file.

10. The microprocessor according to claim 9, wherein each of said bypass circuits is arranged on said register file and between said first half of bit sliced circuits and said second half of bit sliced circuits of said plurality of bit sliced circuits forming a corresponding bit sliced circuit group.

11. The microprocessor according to claim 9, wherein each of said bypass circuits is arranged on said register file and said plurality of bit sliced circuits forming a corresponding bit sliced circuit group.

12. A microprocessor for executing in parallel a first instruction and a second instruction, comprising:

a register file having a plurality of storage elements each storing a plurality of data; and a plurality of bit sliced circuit groups provided corresponding to said plurality of storage elements, each bit sliced circuit group having a first bit sliced circuit for processing data supplied from said register file in accordance with said first instruction and a second bit sliced circuit for processing data supplied from said register file in accordance with said second instruction; wherein said first bit sliced circuit is arranged on one side of said register file, said second bit sliced circuit is arranged on the opposite side of said register file and said first and second bit sliced circuits of each bit sliced circuit group are coupled to a corresponding one of said storage elements.

13. The microprocessor according to claim 12, wherein each of said first and second bit sliced circuits is pipelined and includes a plurality of pipeline stages for sequentially processing a corresponding data, said microprocessor further comprising a plurality of bypass circuits provided corresponding to said plurality of bit sliced circuit groups and each supplying processed data in one of the pipeline stages in said first bit sliced circuit forming a corresponding bit sliced circuit group to the corresponding second bit sliced circuits.

14. The microprocessor according to claim 13, wherein each of said bypass circuits is arranged on said register file and between said first and second bit sliced circuits forming a corresponding bit sliced circuit group.

15. The microprocessor according to claim 12, wherein said plurality of storage elements in said register file are arranged in a predetermined direction, and said first bit sliced circuits in said plurality of bit sliced circuit groups are arranged on one side of said register file in said predetermined direction, and said second bit sliced circuits in said plurality of bit sliced circuit groups are arranged on the opposite side of said register file in said predetermined direction.

16. A data processor executing first and second instructions in a program, comprising:

a register file having a plurality of storage elements arranged in a predetermined direction, each storage element for storing data;

a plurality of first processing circuits correspondingly connected to said plurality of said storing elements, each first processing circuit for processing data supplied from the corresponding storing element in accordance with said first instruction; and a plurality of second processing circuits correspondingly connected to said plurality of said storing elements, each second processing circuit for processing data supplied from the corresponding storing element in accordance with said second instruction, said plurality of second processing circuits being operated in parallel with said plurality of first processing circuits, wherein said plurality of first processing circuits are arranged on one side of said register file and said plurality of second processing circuits are arranged on the opposite side of said register file, and each of said plurality of storage elements, the corresponding first processing circuit and the corresponding second circuit are arranged in a direction substantially perpendicular to said predetermined direction.

17. The data processor according to claim 16, further comprising a plurality of bypass circuits provided corresponding to said plurality of first processing circuits, each bypass circuit supplying a processed result in the corresponding first processing circuit to one of said plurality of second processing circuit.

18. The data processor according to claim 16, wherein said plurality of first processing circuits are arranged in said predetermined direction and said plurality of second processing circuits are arranged in said predetermined direction.

* * * * *

UNITED STATES PATENT AND TRADEMARK OFFICE
CERTIFICATE OF CORRECTION

PATENT NO. : 5,918,065
DATED : June 29, 1999
INVENTOR(S) : Hideki Ando

It is certified that error appears in the above-identified patent and that said Letters Patent is hereby corrected as shown below:

IN THE CLAIMS:

Claim 1, line 5, delete, "a plurality of";

Claim 12, line 4, delete, "a plurality of";

Claim 16, line 24, after "second", insert --processing--

Signed and Sealed this

Fourth Day of January, 2000

Attest:

Attesting Officer

Acting Commissioner of Patents and Trademarks